US012208820B2

(12) United States Patent
Karna et al.

(10) Patent No.: US 12,208,820 B2
(45) Date of Patent: Jan. 28, 2025

(54) HYBRID CHALLENGER MODEL THROUGH PEER-PEER REINFORCEMENT FOR AUTONOMOUS VEHICLES

(71) Applicant: INTERNATIONAL BUSINESS MACHINES CORPORATION, Armonk, NY (US)

(72) Inventors: Geetha Karna, Bengaluru (IN); Sreekanth L. Kakaraparthy, Bangalore (IN); Saraswathi Sailaja Perumalla, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 17/457,086

(22) Filed: Dec. 1, 2021

(65) Prior Publication Data
US 2023/0166766 A1 Jun. 1, 2023

(51) Int. Cl.
 *G06N 20/00* (2019.01)
 *B60W 60/00* (2020.01)
 *G01C 21/34* (2006.01)
 *H04W 4/46* (2018.01)

(52) U.S. Cl.
 CPC ..... *B60W 60/0015* (2020.02); *G01C 21/3461* (2013.01); *G06N 20/00* (2019.01); *H04W 4/46* (2018.02); *B60W 2552/05* (2020.02); *B60W 2554/4048* (2020.02)

(58) Field of Classification Search
 CPC ..... B60W 2552/05; B60W 2554/4048; B60W 60/0015; G01C 21/3461; G06N 20/00; H04W 4/46
 See application file for complete search history.

(56) References Cited

U.S. PATENT DOCUMENTS

| 8,190,322 B2 | 5/2012 | Lin |
| 9,817,399 B2 | 11/2017 | Braunstein |
| 2012/0306663 A1* | 12/2012 | Mudalige ............. B60W 30/09 |
| | | 701/1 |

(Continued)

FOREIGN PATENT DOCUMENTS

| AU | 2021102602 A4 * | 7/2021 |
| CN | 108109413 B | 6/2020 |

(Continued)

OTHER PUBLICATIONS

David Elliott, Walter Keen, Lei Miao, "Recent advances in connected and automated vehicles," Journal of Traffic and Transportation Engineering (English Edition), vol. 6, Issue 2, 2019, pp. 109-131, ISSN 2095-7564, https://doi.org/10.1016/j.jtte.2018.09.005.

(Continued)

*Primary Examiner* — Aryan E Weisenfeld
*Assistant Examiner* — Farhad Dawodi
(74) *Attorney, Agent, or Firm* — Yee & Associates, P.C.

(57) ABSTRACT

A driverless vehicle system comprises a processor that is configured to communicate information related to attributes of a focus autonomous vehicle (FAV) to an other peer vehicle (PV) and/or a central repository system (CRS). The processor is further configured to communicate information about a corrective action by at least one of the FAV and a previously contacted vehicle to the CRS or to a further peer vehicle that is within a predefined region.

16 Claims, 7 Drawing Sheets

(56) References Cited

U.S. PATENT DOCUMENTS

| | | | | |
|---|---|---|---|---|
| 2016/0379485 A1* | 12/2016 | Anastassov | .......... | G08G 1/0129 |
| | | | | 701/117 |
| 2018/0025650 A1* | 1/2018 | Taveira | .................. | G05D 1/106 |
| | | | | 701/3 |
| 2018/0050698 A1* | 2/2018 | Polisson | .............. | G05D 1/0061 |
| 2018/0162400 A1* | 6/2018 | Abdar | .................. | B60W 50/16 |
| 2018/0210072 A1* | 7/2018 | Yu | .......................... | G01S 7/4817 |
| 2018/0261100 A1* | 9/2018 | Rachmawati | .......... | B63B 49/00 |
| 2020/0025577 A1* | 1/2020 | Montemerlo | .......... | G06F 16/583 |
| 2020/0065728 A1* | 2/2020 | Wilson | ..................... | G06N 5/01 |
| 2020/0068629 A1* | 2/2020 | May | ..................... | H04L 41/0886 |
| 2020/0122744 A1* | 4/2020 | Badigannavar | ........ | G08G 1/144 |
| 2021/0255622 A1* | 8/2021 | Haynes | ............. | B60W 60/0027 |
| 2021/0309261 A1* | 10/2021 | Rosales | ............... | B60W 60/001 |
| 2022/0027640 A1* | 1/2022 | Tosa | ........................ | G06V 10/25 |
| 2022/0051589 A1* | 2/2022 | Madison | .............. | G09B 19/167 |
| 2022/0126864 A1* | 4/2022 | Moustafa | ......... | G08G 1/096775 |
| 2022/0147664 A1* | 5/2022 | Villa | ....................... | G06F 30/20 |
| 2022/0368881 A1* | 11/2022 | Maleki | ................. | H04N 13/268 |
| 2023/0049128 A1* | 2/2023 | Zhu | ....................... | B60T 17/221 |

FOREIGN PATENT DOCUMENTS

| | | | | |
|---|---|---|---|---|
| CN | 115768678 A * | 3/2023 | ............. | B60T 8/172 |
| DE | 3237439 C2 * | 3/1989 | | |
| JP | 2017224075 A * | 12/2017 | | |
| WO | WO-2014087374 A1 * | 6/2014 | ........... | C12C 11/003 |
| WO | 2017079474 A2 | 5/2017 | | |
| WO | WO-2022093239 A1 * | 5/2022 | ............ | G06F 11/079 |

OTHER PUBLICATIONS

Jeffrey Roderick Norman Forbes, "Reinforcement Learning for Autonomous Vehicles," Dissertation, University of California Berkley, Spring 2002, https://users.cs.duke.edu/~forbes/papers/thesis.pdf.

L. Chisalita and N. Shahmehri, "A peer-to-peer approach to vehicular communication for the support of traffic safety applications," Proceedings. The IEEE 5th International Conference on Intelligent Transportation Systems, 2002, pp. 336-341, doi: 10.1109/ITSC.2002.1041239.

Liu, T., Mu, X., Huang, B., Tang, X., Zhao, F., Wang, X., & Cao, D. (2020). Decision-making at Unsignalized Intersection for Autonomous Vehicles: Left-turn Maneuver with Deep Reinforcement Learning. ArXiv, abs/2008.06595.

Maria Martin, "29 Must-Know Self-Driving Statistics (2020 Edition)," CarSurance, Feb. 12, 2021, https://carsurance.net/blog/self-driving-car-statistics/. Retrieved from internet on Oct. 15, 2021.

Method and System of an Optimized Vehicle mechanism, IP.com, published Dec. 18, 2020, IPCOM000264457D, https://priorart.ip.com/IPCOM/000264457.

Peter Mell and Timothy Grance, "The NIST Definition of Cloud Computing—Recommendations of the National Institute of Standards and Technology," NIST Special Publication 800-145, Computer Security Division—U.S. Department of Commerce, Sep. 2011.

Road Traffic Injuries, World Health Organization, Jun. 21, 2021, https://www.who.int/news-room/fact-sheets/detail/road-traffic-injuries. Retrieved from internet on Oct. 15, 2021.

* cited by examiner

HYBRID CHALLENGER MODEL THROUGH PEER-PEER REINFORCEMENT FOR AUTONOMOUS VEHICLES

BACKGROUND

Disclosed herein is a system and related method for utilizing a hybrid challenger model through peer-to-peer reinforcement for autonomous vehicles. In particular, the hybrid challenger model deals with edge conditions that relate to conditions for potential autonomous vehicle accidents.

SUMMARY

According to one aspect disclosed herein, a driverless vehicle system comprises a processor that is configured to communicate information related to attributes of a focus autonomous vehicle (FAV) to an other peer vehicle (PV) and/or a central repository system (CRS). The processor is further configured to communicate information about a corrective action taken by at least one of the FAV and a previously contacted vehicle to the CRS or to a further peer vehicle that is within a predefined region.

According to another aspect disclosed herein, a computer implemented method is provided for operating a driverless vehicle system, comprising communicating information related to attributes of a focus autonomous vehicle (FAV) to another entity selected from the group consisting of a central repository system (CRS) and a peer vehicle (PV), and communicating information related to a corrective action by at least one of the FAV and a previously contacted vehicle to the CRS or a further peer vehicle that is within a predefined region.

A computer program product is further provided for implemented the system and method described above.

The computer program product contains instructions that are, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:

TABLE 1

| General Acronyms | |
|---|---|
| API | application program interface |
| ARM | advanced RISC machine |
| CD-ROM | compact disc ROM |
| CPU | central processing unit |
| DPS | data processing system |
| DVD | digital versatile disk |
| EPROM | erasable programmable read-only memory |
| FPGA | field-programmable gate arrays |
| HA | high availability |
| IaaS | infrastructure as a service |
| I/O | input/output |
| IPL | initial program load |
| ISP | Internet service provider |
| ISA | instruction-set-architecture |
| LAN | local-area network |
| LPAR | logical partition |
| PaaS | platform as a service |
| PDA | personal digital assistant |
| PLA | programmable logic arrays |
| RAM | random access memory |
| RISC | reduced instruction set computer |
| ROM | read-only memory |
| SaaS | software as a service |
| SLA | service level agreement |
| SRAM | static random-access memory |
| WAN | wide-area network |

Data Processing System in General

Figure 1A:
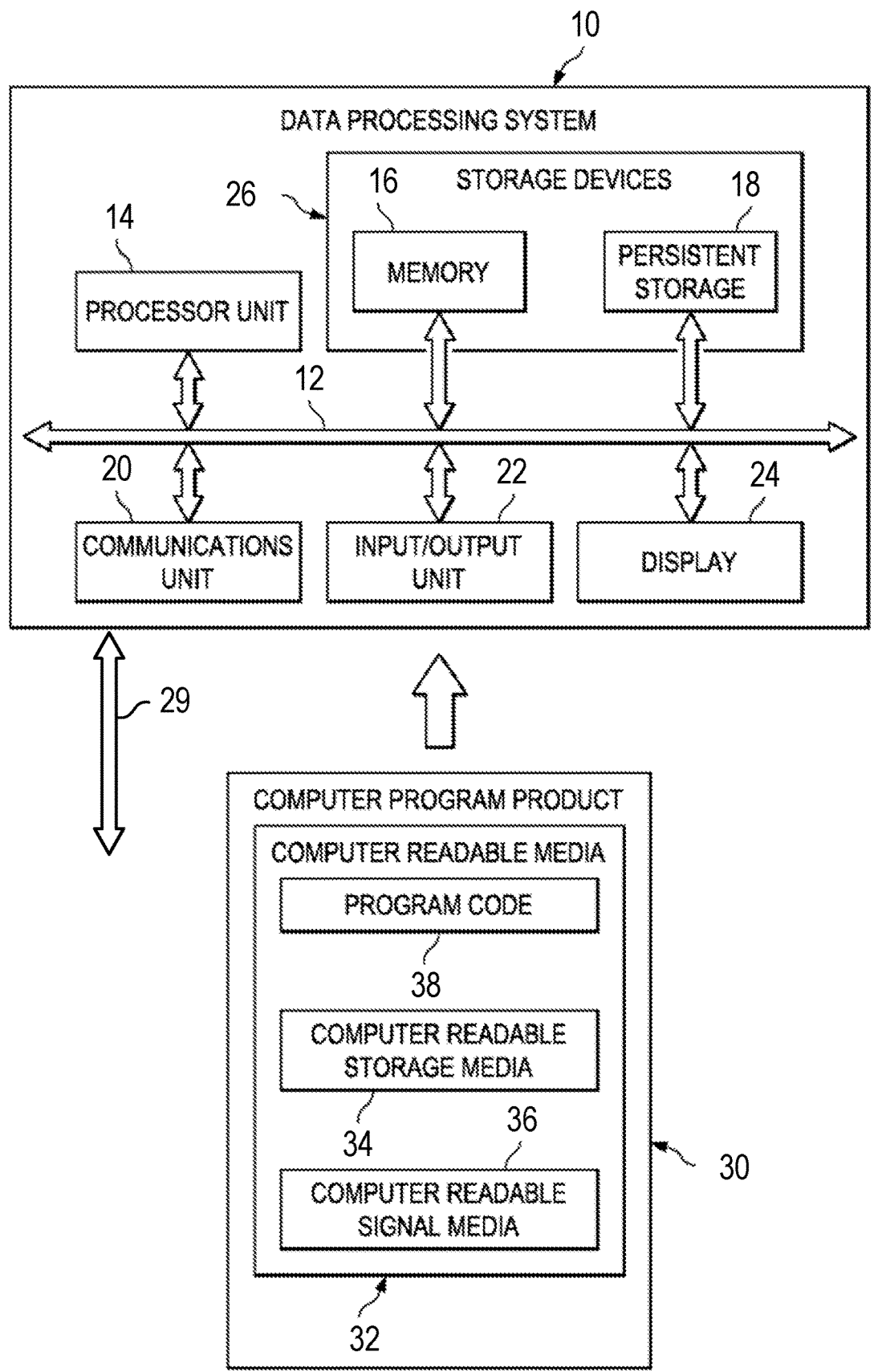
FIG. 1A is a block diagram of a data processing system (DPS) according to one or more embodiments disclosed herein.

FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
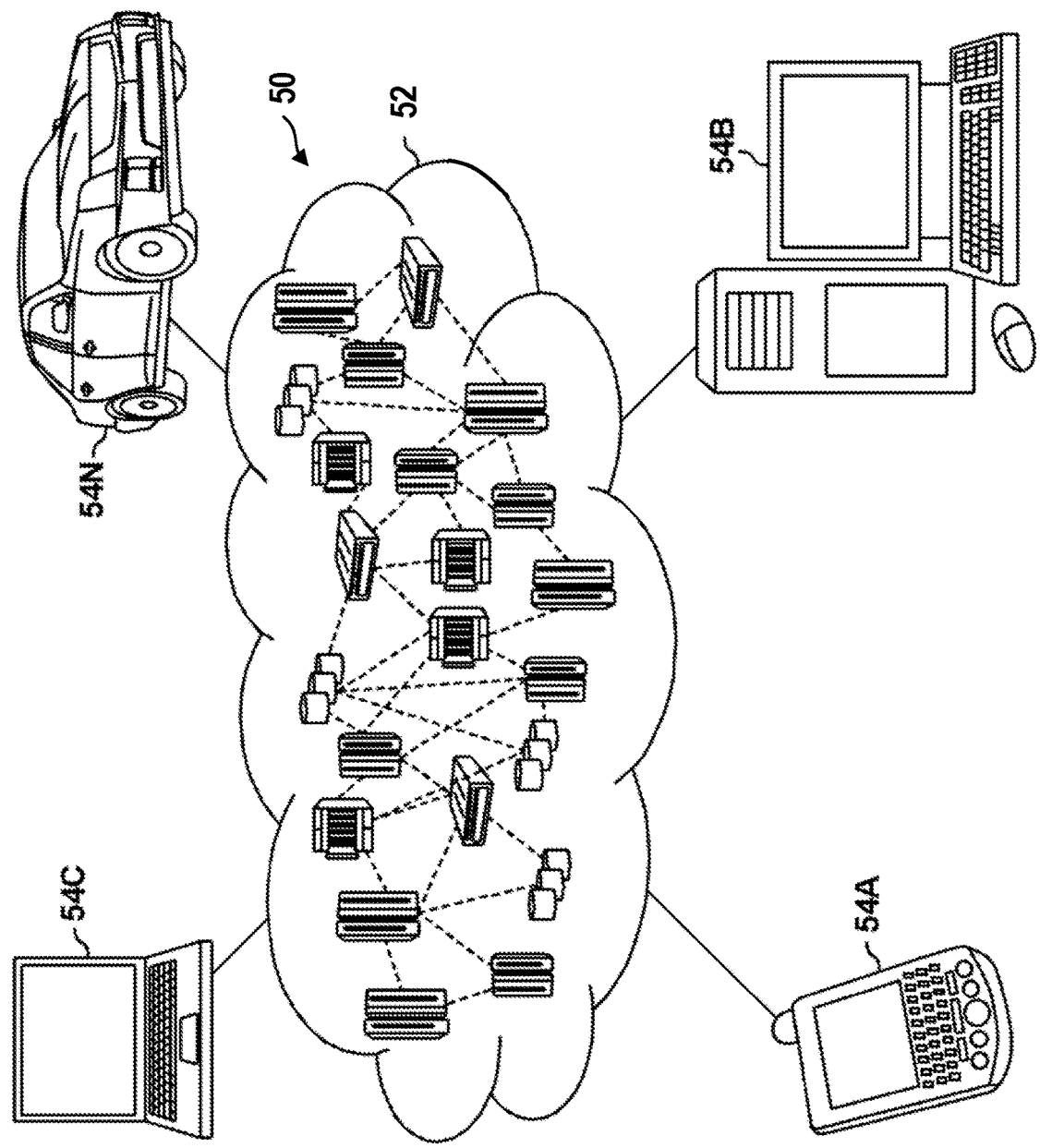
FIG. 1B is a pictorial diagram that depicts a cloud computing environment according to one or more embodiments disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
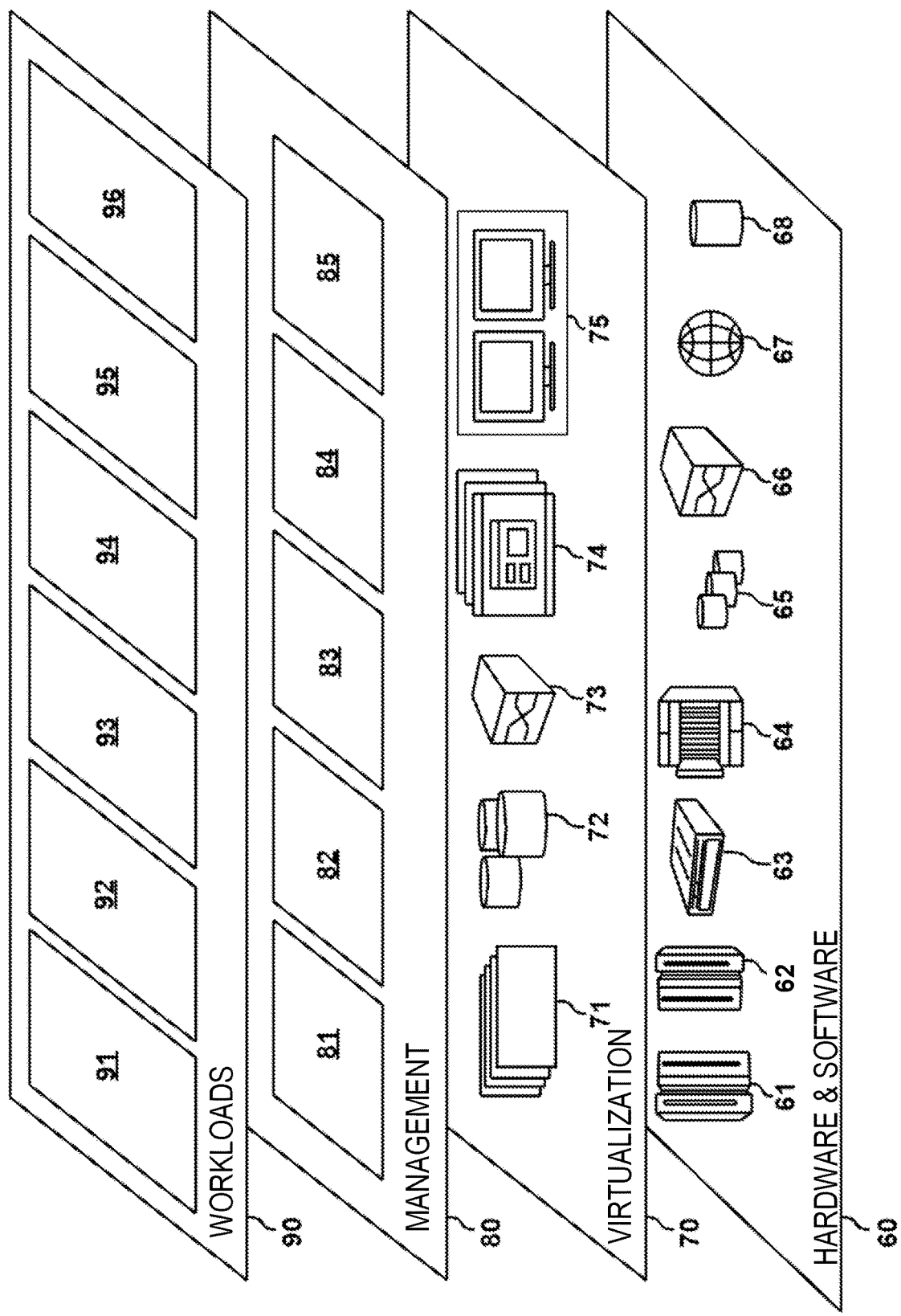
FIG. 1C is a pictorial diagram that depicts abstraction model layers according to one or more embodiments disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Neural Networks

Figure 1D:
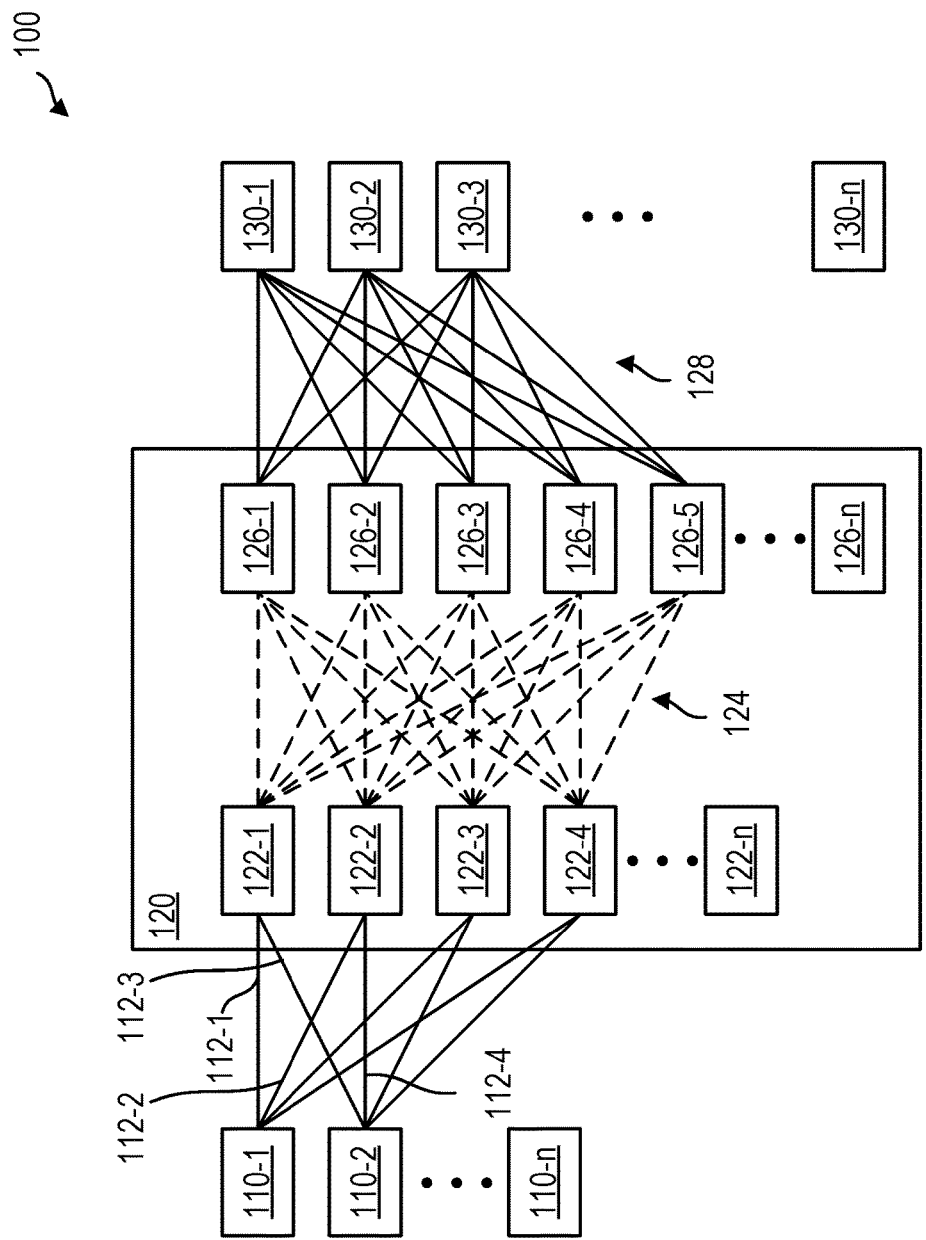
FIG. 1D is a block diagram illustrating a classifying neural network, according to one or more embodiments disclosed herein.

FIG. 1D depicts an example neural network (NN) 100 representative of one or more artificial NNs, consistent with various embodiments of the present disclosure. The NN 100 is made up of a plurality of layers. The network 100 includes an input layer 110 (the input layer 110 refers to the input neurons 110-1, 110-2, 110-3, 110-4, . . . , 110-$n$ that collectively comprise it; also the input neurons may be referred to generically as 110-$x$), a hidden section 120, and an output layer 130 (the output layer 130 refers to the output neurons 130-1, 130-2, 130-3, . . . , 130-$n$ that collectively comprise it; also the input neurons may be referred to generically as 130-$x$)). Though network 100 depicts a feed-forward NN, other NNs layouts may also be utilized, such as a recurrent NN layout (not depicted). In some embodiments, the NN 100 may be a design-and-run NN and the layout depicted may be created by a computer programmer. In some embodiments, the NN 100 may be a design-by-run NN, and the layout depicted may be generated by the input of data and by the process of analyzing that data according to one or more defined heuristics. The NN 100 may operate in a forward propagation by receiving an input and outputting a result of the input. The NN 100 may adjust the values of various components of the NN by a backward propagation (back propagation).

The input layer 110 includes a series of input neurons 110-1, 110-2, up to 110-$n$ (collectively, 110) and a series of input connections 112-1, 112-2, 112-3, 112-4, etc. (collectively, 112). The input layer 110 represents the input from data that the NN is supposed to analyze. Each input neuron 110 may represent a subset of the input data. For example, the NN 100 may be provided with a series of values from a data source, and the series of values may be represented by, e.g., a series of floating-point numbers.

In another example, by way of illustration only, the input neuron 110-1 may be the first pixel of a picture, input neuron 110-2 may be the second pixel of the picture, etc. The number of input neurons 110 may correspond to the size of the input. For example, when the NN 100 is designed to analyze images that are 256 pixels by 256 pixels, the NN layout may include a series of 65,536 input neurons. The number of input neurons 110 may correspond to the type of input. For example, when the input is a color image that is 256 pixels by 256 pixels, the NN layout may include a series of 196,608 input neurons (65,536 input neurons for each of the red, green, and blue values of each pixel). The type of input neurons 110 may correspond to the type of input. In a first example, an NN may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, an NN may be designed to analyze images that are color, and each of the input neurons may be a three-dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 112 represent the output of the input neurons 110 to the hidden section 120. Each of the input connections 112 varies depending on the value of each input neuron 110-$x$ and based upon a plurality of weights (not depicted). For example, the first input connection 112-1 has a value that is provided to the hidden section 120 based on the input neuron 110-1 and a first weight. Continuing the example, the second input connection 112-2 has a value that is provided to the hidden section 120 based on the input neuron 110-1 and a second weight. Further continuing the example, the third input connection 112-3 based on the input neuron 110-2 and a third weight, etc. Alternatively stated, the input connections 112-1 and 112-2 share the same output component of input neuron 110-1 and the input connections 112-3 and 112-4 share the same output component of input neuron 110-2; all four input connections 112-1, 112-2, 112-3, and 112-4 may have output components of four different weights. Though the NN 100 may have different weightings for each connection 112, some embodiments may contemplate weights that are similar. In some embodiments, each of the values of the input neurons 110 and the connections 112 may be stored in memory.

The hidden section 120 includes one or more layers that receive inputs and produce outputs. The hidden section 120 may include a first hidden layer of calculation neurons 122-1, 122-2, 122-3, 122-4, up to 122-$n$ (collectively, 122); a second hidden layer of calculation neurons 126-1, 126-2, 126-3, 126-4, 126-5, up to 126-$n$ (collectively 126); and a series of hidden connections 124 coupling the first hidden layer 122 and the second hidden layer 126. The NN 100 only depicts one of many NNs consistent with some embodiments of the disclosure. Consequently, the hidden section 120 may be configured with more or fewer hidden layers, which may, in some cases extend to hundreds or more—two hidden layers are depicted for example purposes.

The first hidden layer includes the calculation neurons 122-1, 122-2, 122-3, 122-4, up to 122-$n$. Each calculation neuron 122-$x$ of the first hidden layer 122 may receive as input one or more of the connections 112-$x$. For example, calculation neuron 122-1 receives input connection 112-1 and input connection 112-2. Each calculation neuron 122-$x$ of the first hidden layer 112 also provides an output. The output is represented by the dotted lines of hidden connections 124 flowing out of the first hidden layer 122. Each of the calculation neurons 122-$x$ performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, a number between −0.5 and 0.5, etc.) and calculating a single non-binary output (e.g., a number between 0 and 1, a number between −0.5 and 0.5, etc.). Various functions may be performed to calculate the activation function (e.g., a sigmoid neurons or other logistic functions, tan h neurons, softplus functions, softmax functions, rectified linear units, etc.). In some embodiments, each of the calculation neurons 122-*x* also contains a bias (not depicted). The bias may be used to decide the likelihood or valuation of a given activation function. In some embodiments, each of the values of the biases for each of the calculation neurons is stored in memory.

The NN 100 may include the use of a sigmoid neuron for the activation function of a calculation neuron 122-1. An equation (Equation 1, stated below) may represent the activation function of calculation neuron 110-1 as f(neuron). The logic of calculation neuron 122-1 may be the summation of each of the input connections that feed into calculation neuron 122-1 (i.e., input connection 112-1 and input connection 112-3) which are represented in Equation 1 as j. For each j, the weight w is multiplied by the value x of the given connected input neuron 110. The bias of the calculation neuron 122-1 is represented as b. Once each input connection j is summed the bias b is subtracted. Finalizing the operations of this example as follows: given a larger positive number of results from the summation and bias in activation f(neuron), the output of calculation neuron 122-1 approaches approximately 1; given a larger negative number of results from the summation and bias in activation f(neuron), the output of calculation neuron 122-1 approaches approximately 0; and given a number somewhere in between a larger positive number and a larger negative number of results from the summation and bias in activation f(neuron), the output varies slightly as the weights and biases vary slightly.

$$f(\text{neuron}) = \frac{1}{1 + \exp\left(-\sum_j w_j x_j - b\right)} \quad \text{Equation 1}$$

The second hidden layer 126 includes the calculation neurons 126-1, 126-2, 126-3, 126-4, 126-5, up to 126-*n*. In some embodiments, the calculation neurons 126-*x* of the second hidden layer 126 may operate similarly to the calculation neurons 122-*x* of the first hidden layer. For example, the calculation neurons 126-1 to 126-*n* may each operate with a similar activation function as the calculation neurons 122-1 to 122-*n*. In some embodiments, the calculation neurons 126-*x* of the second hidden layer may operate differently to the calculation neurons 122-*x* of the first hidden layer 122. For example, the calculation neurons 126-1 to 126-*n* may have a first activation function, and the calculation neurons 122-1 to 122-*n* may have a second activation function.

Similarly, the connectivity to, from, and between the various layers of the hidden section 120 may also vary. For example, the input connections 112-*x* may be fully connected to the first hidden layer and hidden connections 124-*x* may be fully connected from the first hidden layer 122 to the second hidden layer 126. In some embodiments, fully connected means that each neuron of a given layer may be connected to all the neurons of a previous layer. In some embodiments, fully connected means that each neuron of a given layer may function completely independently and may not share any connections. In a second example, the input connections 112-*x* may not be fully connected to the first hidden layer and the hidden connections 124-*x* may not be fully connected from the first hidden layer to the second hidden layer 126.

Further, the parameters to, from, and between the various layers of the hidden section 120 may also vary. In some embodiments, the parameters may include the weights and the biases. In some embodiments, there may be more or fewer parameters than the weights and biases. For purposes of example, NN 100 may be in the form of a convolutional NN or convolution NN. The convolutional NN may include a sequence of heterogeneous layers (e.g., an input layer 110, a convolution layer 122, a pooling layer 126, and an output layer 130). In such an NN 100, and by way of example, the input layer may hold the raw pixel data of an image in a three-dimensional volume of width, height, and color. The convolutional layer 122 of such an NN 100 may output from connections that are local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as additional parameters (e.g., depth, stride, and padding). The pooling layers 126 of such an NN 100 may take as input the output of the convolutional layers 122 but perform a fixed function operation (e.g., an operation that does not take into account any weight or bias). Also in this example, the pooling layer 126 may not contain any convolutional parameters and may also not contain any weights or biases (e.g., performing a down-sampling operation).

The output layer 130 includes a series of output neurons 130-1, 130-2, 130-3, up-to 130-*n* (representatively 130-*x*). The output layer 130 holds a result of the analyzation of the NN 100. In some embodiments, the output layer 130 may be a categorization layer used to identify a feature of the input to the NN 100. For example, the NN 100 may be a classification NN trained to identify Arabic numerals. In such an example, the NN 100 may include ten output neurons 130 corresponding to which Arabic numeral the NN 100 has identified (e.g., output neuron 130-2 having a higher activation value than output neurons 130 may indicate the NN determined an image contained the number '1'). In some embodiments, the output layer 130 may be a real-value target (e.g., trying to predict a result when an input is a previous set of results) and there may be only a singular output neuron (not depicted). The output layer 130 is fed from an output connections 128-*x*. Output connections 128 provide the activations from the hidden section 120. In some embodiments, the output connections 128 may include weights and the output neurons 130 may include biases.

Training the NN 100 may include performing back propagation. Back propagation is different from forward propagation. Forward propagation may include feeding of data into the input neurons 110; performing the calculations of the connections 112, 124, 128; and performing the calculations of the calculation neurons 122 and 126. The forward propagation may also be the layout of a given NN (e.g., recurrence, number of layers, number of neurons in one or more layers, layers being fully connected or not to other layers, etc.). Back propagation may be used to determine an error of the parameters (e.g., the weights and the biases) in the NN 100 by starting with the output neurons 130 and propagating the error backward through the various connections 128, 124, 112 and layers 126, 122, respectively.

Back propagation includes performing one or more algorithms based on one or more training data to reduce the difference between what a given NN determines from an input and what the given NN should determine from the input. The difference between an NN determination and the correct determination may be called the objective function (alternatively, the cost function). When a given NN is initially created and data is provided and calculated through a forward propagation, the result or determination may be an incorrect determination. For example, NN 100 may be a classification NN; may be provided with a 128 pixel by 250 pixel image input that contains the number '3'; and may determine that the number is most likely "9" and is second most likely "2" and is third most likely "3" (and so on with the other Arabic numerals). Continuing the example, performing a back propagation may alter the values of the weights of connections 112, 124, and 128; and may alter the values of the biases of the first layer of calculation neurons 122, the second layer of calculation neurons 126, and the output neurons 130. Further continuing the example, the performance of the back propagation may yield a future result that is a more accurate classification of the same 128 pixel by 250 pixel image input that contains the number "3" (e.g., more closely ranking "9", "2", then "3" in order of most likely to least likely, ranking "9", then "3", then "2" in order of most likely to least likely, ranking "3" the most likely number, etc.).

Equation 2 provides an example of the objective function ("example function") in the form of a quadratic cost function (e.g., mean squared error)—other functions may be selected, and the mean squared error is selected for example purposes. In Equation 2, all of the weights may be represented by w and biases may be represented by b of NN 100. The NN 100 is provided a given number of training inputs n in a subset (or entirety) of training data that have input values x. The NN 100 may yield output a from x and should yield a desired output y(x) from x. Back propagation or training of the NN 100 should be a reduction or minimization of the objective function 'O(w,b)' via alteration of the set of weights and biases. Successful training of NN 100 should not only include the reduction of the difference between the answer a and the correct answers y(x) for the input values x, but given new input values (e.g., from additional training data, from validation data, etc.).

$$O(w, b) \equiv \frac{1}{2n} \sum_{k} \|y(x) - a\|^2 \qquad \text{Equation 2}$$

Many options may be utilized for back propagation algorithms in both the objective function (e.g., mean squared error, cross-entropy cost function, accuracy functions, confusion matrix, precision-recall curve, mean absolute error, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the NN 100 may be small in any given iteration. Back propagation algorithms may be repeated for many iterations to perform accurate learning as a result of the necessitated smallness of any given iteration.

For example, NN 100 may have untrained weights and biases, and back propagation may involve the stochastic gradient descent to train the NN over a subset of training inputs (e.g., a batch of ten training inputs from the entirety of the training inputs). Continuing the example, the NN 100 may continue to be trained with a second subset of training inputs (e.g., a second batch of ten training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would complete an epoch of the training data. Many epochs may be performed to continue training of an NN. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained NN, too many training epochs may yield overfitting in a trained NN, etc.). Further, NN 100 may be evaluated to quantify the performance of evaluating a dataset, such as by use of an evaluation metric (e.g., mean squared error, cross-entropy cost function, accuracy functions, confusion matrix, precision-recall curve, mean absolute error, etc.).

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Hybrid Challenger Model Through Peer-to-Peer Reinforcement for Autonomous Vehicles The following application-specific acronyms may be used below:

TABLE 2

| Application-Specific Acronyms | |
|---|---|
| 5G | fifth generation (communications) |
| ADAS | advanced driver assistance system |
| AV | autonomous vehicle |
| CM | challenger model |
| CRS | central repository system |
| GPS | global positioning system |
| HMI | human-machine interface |
| IoT | Internet of Things |
| LiDAR | light detection and ranging |
| ML | machine learning (element) |
| MPH | miles per hour |
| MV | manual vehicle |
| NN | neural network |
| V2V | vehicle-to-vehicle |

In recent years, with further economic advancement and the advancement of urbanization, global car ownership has gradually increased. Recent advancements in intelligent transportation systems suggest that the roads will gradually be filled with autonomous vehicles (AVs) that are able to drive themselves while communicating with each other and the infrastructure. While AVs are believed to provide numerous benefits for individuals and society, many barriers, like accidents, maintenance costs, and resulting traffic congestion still hinder the widespread acceptance of AVs. A user's acceptance of autonomous driving is important for autonomous driving to become a realistic part of future transportation.

Autonomous vehicles equipped with this innovation increase the acceptance of autonomous driving vehicles, thus providing multiple benefits like: a) improving driving efficiencies and reducing accidents; b) increasing road safety and reducing traffic congestion; c) optimizing land usage—autonomous vehicles are able to drop off passengers in dense metropolitan areas before driving themselves to nearby satellite parking areas, all done with increased safety; d)

reducing in carbon dioxide emissions and fuel consumption by optimizing traffic flow, thus improving the AV's ecological footprint; e) lowering commuter-related stress due to commute time reduction; and f) improving access to mobility, especially for elderly and physically impaired people, by ensuring secure participation in traffic.

At present, the AV accident rate per mile is around double that of vehicles with human drivers. Predictions are, however, that the demand for autonomous vehicles is growing significantly. Many of the current self-driving methods focus on how to directly learn end-to-end self-driving control strategy from raw sensory data. This control strategy may be considered as a mapping between images and driving behavior, which usually faces a problem of low generalizability. To improve the generalizability for the driving behavior, learning methods used may benefit from an extrinsic reward from the real-world environment.

Disclosed herein is a system and method to train vehicles to optimize the vehicle learning and judgment function, reduce the time required for judgment calculation, and quickly select the optimal action through a hybrid challenger model which leverages peer to peer reinforcement.

Figure 2:
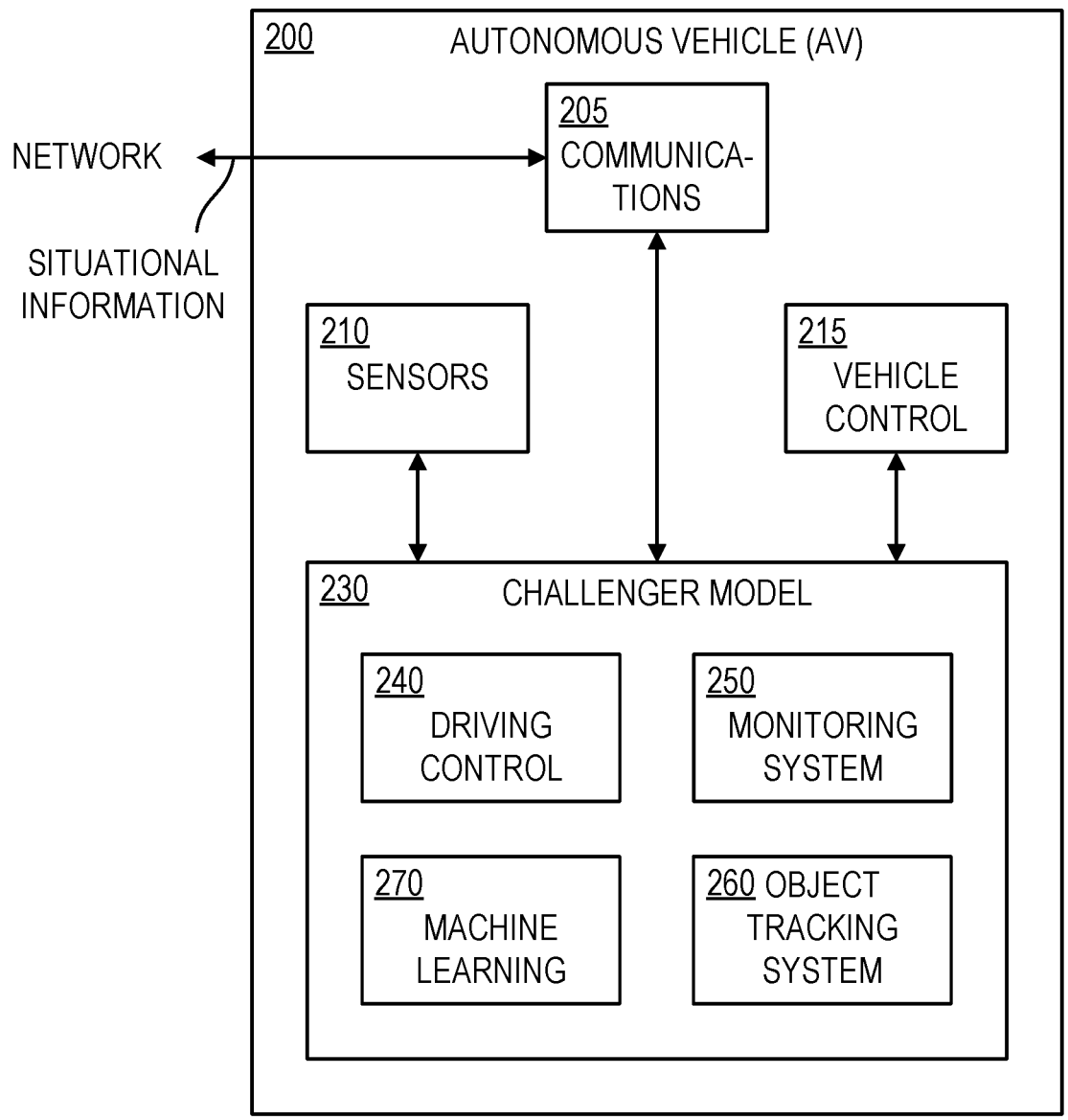
FIG. 2 is a block diagram of an example autonomous vehicle, according to one or more embodiments disclosed herein.

FIG. 2 is a block diagram that illustrates some of the components that may be present in an AV 200 according to some embodiments. The AV 200 shown comprises a communications component 205, sensors 210, and a vehicle control 215. The AV 200 also comprises a challenger model 230 that is used, among other things, to help the AV 200 deal with edge-type situations.

The communications module 205 may comprise wireless communications technology permitting communications over a cellular network, wide-area network, and local area network, and may incorporate fifth generation (5G) communications to local devices, including other vehicles and IoT/edge devices, as well as to remote locations, such as cloud systems and the servers/services they contain. The communications module may utilize known vehicle-to-vehicle (V2V) communication protocols as well. The communications module may have a high-bandwidth and low latency such that information may be communicated to/from the AV 200 very rapidly to deal with accident and object avoidance in real-time. Information about previously known situations may be received by the AV 200 from a central repository system (CRS) 350 (FIG. 3), which may be, e.g., based on global positioning system (GPS) technology.

By way of example, if a lane in a road is closed for repairs, such situational information, based on GPS coordinates or a predefined GPS geofence boundary (or a boundary based on dynamic parameters, such as road conditions or climate conditions), may be communicated to the AV 200 when the CRS 350 determines that the AV 200 will be approaching this closed-lane area (e.g., based on a predefined route or the AV's 200 motion extrapolated over time). Based on this received area, the AV 200 may then reduce its speed to one that is considered safe under these particular conditions. In addition to a CRS 350, or as an extension of the CRS 350, stationary IoT and edge devices in the system may be located closer to the AV than, e.g., cloud servers, which may help reduce latency and improve communications throughput.

In addition to receiving such situational information from the CRS 350 and/or stationary IoT/edge device, the AV 200 may also receive the situational information from other vehicles. Other vehicles and their relationship to a current focus AV 200 are described in more detail below, but may comprise other similar AVs to the focus AV (a vehicle serving as a reference point for discussion) in that they contain a challenger model 230. The other vehicles may also comprise other AVs or manual vehicles (MVs) that have none or only some of the components of the challenger model 230—although these other vehicles may lack certain components, they may still be able to provide valuable situational information, such as information about road conditions, information about further vehicles, information about obstacles and accident avoidance, etc., provided they are able to provide information to the AV 200 via the communications module 205.

In addition to the communications module 205 receiving situational information, the communications module 205 may also be able to transmit situational information that it has acquired. This may be situational information that the AV 200 has received from the other vehicles, but it may also be situational information that it has obtained via sensors 210 about the surrounding environment.

The sensors 210 may include one or more cameras that are capable of capturing and processing picture and video information in mono or stereo and/or from different perspectives, focal lengths, and the like. The sensors 210 may further contain distance and speed sensors, such as radar and light detection and ranging (LiDAR), as well as motion detection devices including accelerometers and the like. The sensors 210 may further contain advanced driver assistance system (ADAS) sensors, ultrasonics, and any form of human-machine interfaces (HMIs) that permit the AV 200 to navigate safely. The AVs may be associated with an existing provider or third-party systems, like GPS, Google Maps®, and peer vehicle information providers. These sensors 210 may obtain raw data and information from the surrounding environment, and the AV 200 may transmit either the raw data and information or situational information that it has processed to the other vehicles, the CRS 350, or other stationary elements associated with the system.

The AV may also comprise a vehicle control 215 that is used to automatically control operation of the vehicle, including controlling actuators for performing finely-tuned steering, accelerating, and breaking. The vehicle control 215 may be able to control the AV 200 better due to it having a substantially faster response time and more precise control. Data obtained from the sensors 210 may be directly or indirectly (via the challenger model 230) utilized by the vehicle control 215.

The challenger model 230 may comprise a driving control 240, a monitoring system 250, an object tracking system 260, and a machine learning element (ML) 270. The challenger model 230 may process received information, either the situational information received via the communications module 205, or raw data received from the sensors 210. The challenger model 230 may be implemented, e.g., on a DPS 10, and the CRS 350 may be implemented, e.g., on a cloud computing node 50 within a cloud computing environment 52. The ML 270 may be implemented as an NN 100, where the input neurons 110-$x$ comprise sensor 210 inputs and other communications module 205 inputs, and the output neurons 130-$x$ are driving control 240 and/or vehicle control 215 outputs. The ML inputs may include information from previous accidents and/or driving events or situations (including safe travels). The ML outputs may be categorized corrective actions that are based on the information from the previous accidents and/or driving events or situations.

The challenger model 230, as a part of its operation, monitors peer AVs' or manual vehicles' decisions at certain edge case scenarios, and the challenger model 230 makes real time decisions based on these monitored decisions and provides information about the true action taken or decision as an input to itself and/or the central repository system.

The driving control 240 may be used to translate higher-level commands into commands that the vehicle control 215 may act upon. For example, if the ML 270 determined that a correct action in a certain situation would be a lane change, then the ML 270 could pass on this high-level command to the driving control 240, which would translate the high-level lane change command, possibly coupled with other data such as that received from the sensors 210, into specific steering commands for the vehicle control 215. The high-level commands could include lane changing, turning around, overtaking another vehicle, accelerate/decelerate to a particular speed, etc.

The AV 200 may deal with environmental aspects that require different types of situational awareness. This situational awareness may be enhanced by a monitoring system 250 as well as an object tracking system 260 that may form a part of the challenger model 230. Although the monitoring system 250 and object tracking system may utilize input received from the sensors 210 (as well as the communications module 250), these systems may operate at a higher level than the sensors 210, and may recognize and help to respond to situations that involve, e.g., other objects, such as vehicles, pedestrians, bikes, traffic signals, signs, weather conditions, road situations/conditions, etc. The object tracking system 260 may identify signs and read sign information from the signs, and may also use the signs in providing instructions to a driving control. Such sign information may include, e.g., identifying sharp curves and accident-prone zone areas. Normal driving on a street, turning, and accelerating/decelerating properly constitutes the majority of operations that an AV 200 deals with, but these are not the most difficult tasks. One of the most difficult tasks is handling an accident well, or, more precisely, handling a potential accident situation in order to best avoid or minimize the results of an accident.

An issue with potential accident situations (an edge case) is that they represent a more extreme case of vehicle operations that occur far less often than normal driving situations, and hence there is not as much historical information available for potential accident situations. One rule of thumb for safety is to consider all of the edge cases for things that could go wrong and be prepared for them. This may, in certain situations, be less of a problem for humans since a human has common sense and a broader situational awareness than algorithms; thus, humans may, in certain cases, be more prepared to handle the edge cases. AVs 200, on the other hand, may be able to handle a greater sensory input in a very small time frame far faster than a human reaction time, and thus, with sufficient training, may be able to handle various edge situations in a more expeditious manner.

A statistical analysis of traffic accidents involving AVs has considered the types of collisions, maneuvers, and errors of the drivers of MVs that led to the traffic accident. The results of the statistical analysis indicate that a "rear-end" type of collision is found more often in traffic accidents with AVs, whereas "pedestrian" and "broadside" types of collisions were found less often in traffic accidents with AVs. The driving control 240, the monitoring system 250, and the object tracking system 260 (as well as the ML 270, discussed in more detail below) may all come into play in these types of edge situations.

In these types of accidents, a leading vehicle may have diverted to another lane or rapidly slowed to a very slow speed due a sudden obstruction, such as an animal on the road, but the trailing vehicle has no information about why the leading vehicle has suddenly changed path or slowed down. In this case, a collision may happen with the trailing car. In such a scenario, the challenger model 230 quickly learns the decision/action taken by the leading vehicle and makes a quick real time decision/action to slow down its vehicle's speed, possibly to the point of stopping, with an immediate use of the breaks, or, if possible, to switch lanes. For example, if a leading car firmly engages its brakes in order to avoid a recently-developed pothole (whose data has not been uploaded to the central repository), then an AV behind the leading car does not have information on the presence of the pothole and may have an existing path that would put it squarely in harm's way of the pothole. In such edge case scenarios, the challenger model 230 may learn from the decision of the peer AV or MV and act immediately by performing a quick check on the decision to see whether the decision is a false alarm or is based on a real-world issue. If there is an actual obstacle to be avoided, the challenge model 230 may rapidly apply the brakes to avoid an accident.

Figure 3:
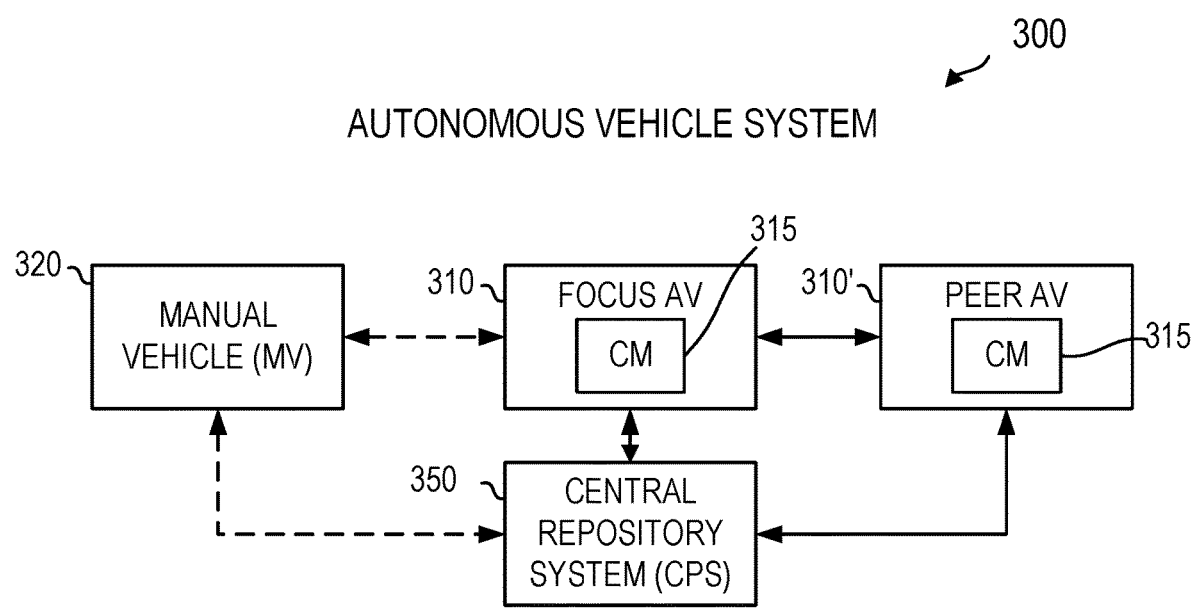
FIG. 3 is a block diagram of an example autonomous vehicle system, according to one or more embodiments disclosed herein.

FIG. 3 is a block diagram that illustrates an autonomous vehicle system 300 that comprises AVs 310, 310' having the CM 315, and that may interact in a more limited way with vehicles that do not, such as the manual vehicle 320. The autonomous vehicle system 300 may further comprise the CRS 350 that may be used to store and share vehicle-related information, including a corpus of corrective actions taken by vehicles in various situations.

In one illustrated use case, the peer AV 310' is a leading vehicle that is in communication with a focus AV 310 following it under normal driving conditions. In a first variant, the location of an obstruction, here a pothole in the road (which may be stored in GPS coordinates) is known by the CRS 350. The information known by the CRS 350 about the obstruction and what actions were taken to deal with it may have been communicated to the CRS 350 by a prior vehicle in the area. Thus, a prior vehicle passing the pothole may have communicated that by slowing down from the speed limit of 55 miles per hour (MPH) to 10 MPH is sufficient to permit safe navigation of the pothole, or that switching to an alternate lane heading the same direction, if available and with adequate distance to do so, is the safest approach to take. Thus, the corrective action to the obstruction of slowing down or changing lanes may be communicated from the CRS 350 to one or more of the AVs 310, 310'.

In this first variant, if only one of the vehicles (e.g., the focus AV 310) received the object information and corrective action information from the CRS 350, the focus AV 310 may, using the communications module 205, communicate this information to the leading peer AV 310' ahead of it using peer-to-peer communications. The focus AV 310 may also communicate this information to any vehicle or IoT/edge node located nearby to reach areas that may be difficult for the CRS 350 to directly communicate with. The focus AV 310 (or the CRS 350) may also communicate this information to a third-party navigation system, such as Google Maps® so that even the driver of a manual vehicle 320 may be able to take advantage of such information and take an appropriate corrective action.

In a second variant, the pothole is a newly formed pothole and thus information about this obstruction is not (yet) available on the CRS 350. In a first sub-variant, the leading vehicle is a manual vehicle (MV) 320, and the driver rapidly brakes. The sensors 210 on the focus AV 310 detect the rapid deceleration of the leading vehicle 320 and feed this information to the challenger model 230. The object tracking system 260, which has been monitoring the speed, direction, and other aspects of the road, registers the rapid deceleration. The monitoring system 250 recognizes that the leading MV 320 is not a part of the autonomous vehicle system 300 and thus relies exclusively on its sensors 210 to determine the actions of the leading MV 320. The ML 270 determines a corrective action based on such a detected rapid deceleration and instructs the driving control 240 to perform the similar rapid deceleration. The driving control communicates with the vehicle control 215 to apply the brakes in a manner consistent with the deceleration. In this first sub-variant, the leading MV 320 may be obstructing the view of the pothole, and thus the focus AV 310 may not know the ultimate nature of the obstruction until the focus AV 310 passes the pothole, at which time the focus AV 310 may collect information about the obstruction, success of the corrective action taken, etc., and pass the information about the obstruction it on to the CRS 350 and other vehicles around the focus AV 310 (or other third-party systems).

In a second sub-variant of the second variant, the leading vehicle is a peer AV 310' instead of an MV 320. The monitoring system 250 of the focus AV 310 is aware of this and the fact that it can communicate directly with the leading peer AV 310'. This may permit a more rapid communication between the focus AV 310 and the leading peer AV 310'. In this second sub-variant, when the leading peer AV 310' detects obstruction (the pothole), it determines the characteristics of the obstruction and, based on its ML 270, determines that an appropriate corrective action is to slow from 55 MPH to 10 MPH to safely navigate the obstruction. The leading peer AV 310' may then pass the obstruction information along with the determined corrective action to the focus AV 310, which may begin acting on it immediately, thus providing a potentially better handling of the situation than the focus AV 310 may have done if it had to rely solely on its sensors to determine the context and corrective action needed. Either (or both) the leading peer AV 310' and/or the focus AV 310 may report the obstacle information, the corrective action taken, and the results of the corrective action taken to the CRS 350 in order to broaden the corpus of the corrective action database within the CRS 350.

In a third variant, the leading vehicle is actually stopped in the road. In a first sub-variant, the leading vehicle is a peer AV 310', in which case the leading peer AV 310' can provide information about it being stopped to the focus AV 310. For example, the leading peer AV 310' may be stopped due to a vehicle malfunction, in which case it may be stopped for a substantial period of time (this may be information learned by and provided by the ML 270). In this case, the corrective action may be to try to pass the leading peer AV 310' if/when it is safe to do so, turn around and head back, or take an alternate route, if possible.

However, if the leading peer AV 310' is stopped for an animal in the road, it may be stopped for only a brief period of time (again, information learned by and provided by the ML 270). In this case, the corrective action may be for the focus AV 310 to simply stop behind the leading peer AV 310', wait for the obstruction to clear, and wait for the leading peer AV 310' to resume its normal travel.

According to some embodiments, the ML 270 may be integrated into the object tracking system 260, or it may be provided as a separate entity, as shown in FIG. 2. The ML 270 may, in some embodiments, be implemented as a classifier that is capable of classifying and extracting 3-D information of the objects detected around the AV 200 by the object tracking system 260 considered for sharing. This method may provide the dimensions and the location of the center point of a particular tracked object for AV 200 and CRS 350 communications. Various embodiments of the ML 270 may be able to provide an accurate and real-time decision which minimizes the delay in an analysis process by validating certain situations.

According to various embodiments, the ML 270 provides peer reinforcement learning to train the focus AV 310 using the learning made by the peer AV 310' in a real time environment. Peer reinforcement learning makes the focus AV 310 own its driving decision-making ability, similar to the way humans understand and react from the decisions made by other peer drivers on the road in a real situation and in a real-time manner. The CRS 350 may contain a corpus of learned activity and corrective actions, and may be shared with the AVs 200, 310, 310'. However, each situation encountered by an AV 200 may have its unique aspects and sensor/context information, and may require communication and processing times such that a particular decision made by the challenger model 230 cannot rely on input in real time from the CRS 350. Use of the challenger model 230 optimizes processing steps simultaneously, which eventually leads to better performance, thus, according to various embodiments, the process may be optimized and configured to take action in certain edge case scenarios, and the decision/action taken by the AV 200 may be used for a continuous learning model.

When a focus AV 310 and peer AV 310' are connected by a network, it is possible to have coordinated actions take place between the AVs. For example, the AVs 310 and 310' may decide to cooperate and take a coordinated (but differing) corrective action to best accommodate a particular situation. For example, if a leading peer AV 310' suddenly encounters an obstacle, its challenger model 230 may determine that it does not have enough distance to stop to avoid an accident. However, its challenger model 230 may determine that there is adequate space in an opposing direction traffic lane to successfully swerve around the obstruction. The trailing focus AV 310 may be in communication with the leading peer AV 310'. Collectively, both vehicles may determine that there is not adequate space in the opposing direction traffic lane for the trailing focus AV 310 to successfully swerve around the obstruction. However, both vehicles may also determine that the trailing focus AV 310 does have enough distance to stop before reaching the obstruction. Thus, the coordinated corrective action determined by the challenger models 230 of both vehicles determines a collective corrective action that results in accident avoidance: the leading peer AV 310' swerves into the oncoming traffic lane and back to avoid the obstacle, while the trailing focus AV 310 applies the brakes to stop and avoid hitting the obstacle.

In an example use case, in order to be added to the autonomous vehicle system 300, an AV 200 may subscribe to the system 300, which may require the AV 200 to have certain hardware and software installed. The new subscriber may be a new vehicle or a vehicle having some form of an existing software platform. Once the subscriber's information is added (which may include the make, type, and year of the AV 200, other information about the AV 200, information about the software platform, etc.), a separate mapping may be done for all the vehicle that are within a proximity of the focus vehicle (including the non-subscribers also) for deep dive analysis.

Once the features of the challenger model 230 are activated, the monitoring system 250 and other components are turned on, and notifications and other information may be provided to the AV when the challenger model 230 is activated, on demand, at periodic intervals, or upon some other form of triggering event. Similarly, the AV may communicate its information that has been saved, including any ML 270 updates, information about its environment(s), sensed data, and/or communications received from or about other vehicles.

A notification may be provided in a variety of forms, such as a warning, alert (for example a customized alert for the corrective action taken), or recommendation to drivers of manual vehicles or AVs for the identified risks and mishaps probability via, e.g., the HMI. Such a notification may be generated by performing real time analytics on the attributes provided by vehicles at run-time with relevant vehicles' capabilities and real time situations of the vehicle. These attributes may include, for example, information about the driver, passenger, vehicle condition, situation (e.g., weather, visibility, etc.), level of driving in terms of a time-based experience level, and type of vehicle, including left steering or right steering, vehicle model, vehicle volume, vehicle weight, and vehicle occupancy. The notification may further take into account peer vehicle input content.

Various embodiments disclosed herein utilize peer enforcement for one type of data feed that is synchronized while the focus AV 310 is on the road, based on actions or decisions taken by previous vehicles on the road. Various embodiments also take into account an explicit input from a peer AV 310' resulting in an explicit action, thereby optimizing the learning process of the focus AV 310. Various embodiments further provide for understanding a next corrective action for any ad hoc road conditions that might lead to crashes or a delay in travel. Peer communication and peer reinforcement enables the focus AV 310 to act with an appropriate corrective action, which may include adjusting the AV's speed, stopping, changing lanes, activating the horn, and/or taking a different route. The corrective action taken may vary according to a distance to an obstruction. For example, the corrective action may comprise braking to avoid the obstacle at a first distance, and steering to avoid the obstacle at a second distance. The corrective action may utilize braking power or engine power of the FAV and/or other vehicles, and/or the relative speed between the FAV and other vehicles, such as the PV.

Figure 4:
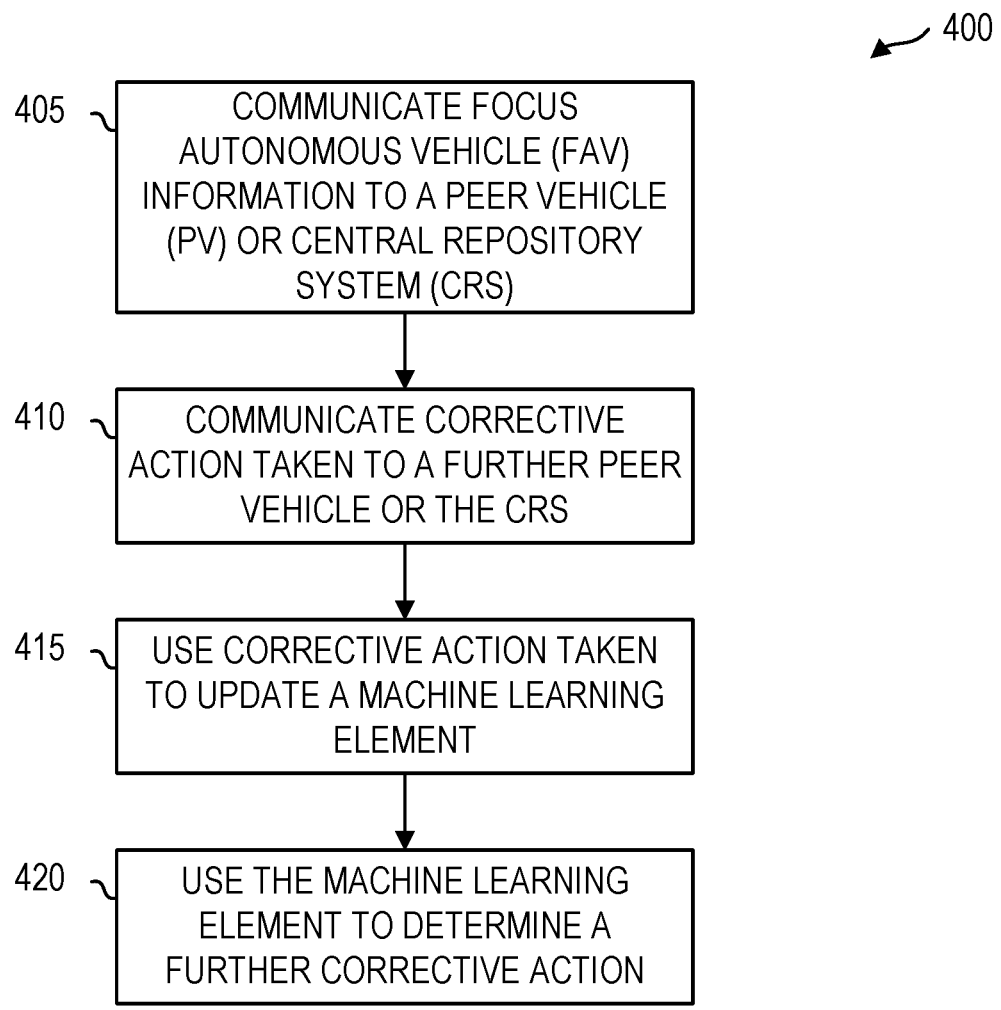
FIG. 4 is a flowchart of an example process for operating the autonomous vehicle system, according to one or more embodiments disclosed herein.

FIG. 4 is a flowchart that illustrates a process 400 that may be implemented, according to some embodiments. In operation 405, the focus AV 310 may communicate vehicle information to a peer AV 310' and/or the CRS 350. This vehicle information may be, in some embodiments, the information provided upon initially subscribing to the autonomous vehicle system 300.

In operation 410, the focus AV 310 may communicate corrective action taken to a further peer vehicle or to the CRS 350. This corrective action information may be information that was generated by the focus AV 310 or that is being relayed from the peer AV 310'. In operation 415, the corrective action data may be further used to update the ML 270 of the challenger model 230. It may also be used to update historical corrective action data in the CRS 350 (that may be used by the ML 270 of the FAV and the PV to generate respective current corrective actions). The further peer vehicle may be any peer AV that is within a 360° view of the FAV. The further peer vehicle may be determined based on a predefined road type or traffic condition. The peer enforcement information may be based on information received from vehicle sensors and communicated to other vehicles for display. The FAV may utilize IoT capabilities to communicate with other vehicles.

In operation 420, the ML 270 may be used to determine, by the focus AV 310, a further corrective action to take. This may be, for example, in response to the peer AV 310' reporting information about an obstacle or hazardous situation ahead of the focus AV 310.

Technical Application

The one or more embodiments disclosed herein accordingly provide an improvement to computer technology used as a control for an autonomous vehicle. For example, an improvement to the handling of edge situations related to potential accident situations allows for safer computer operations during operation of an autonomous vehicle.

What is claimed is:
1. A driverless vehicle system, comprising:
    a memory of a focus autonomous vehicle (FAV);
    an FAV processor of the FAV connected to the FAV memory, wherein the FAV processor is configured to:
        communicate information related to attributes of the FAV to another entity selected from the group consisting of a central repository system (CRS) and a peer vehicle (PV); and
        communicate information related to a previously-sensed corrective action taken by at least one of the FAV and a previously contacted vehicle to the CRS or a further peer vehicle (FPV) that is within a predefined region;
    a memory of the FPV;
    an FPV processor of the FPV connected to the FPV memory, wherein the FPV processor is configured to:
        take the previously-sensed corrective action in response to the corrective action communication; and
    a central repository system (CRS) accessible via a wireless network to the FAV and the PV, and that contains historical corrective action data that is used by a machine learning component of the FAV and the PV to generate respective current corrective actions;
    wherein the machine learning component inputs information from previous vehicles' safe travels, and the machine learning component uses the information from the previous vehicles' safe travels to create the information about the corrective action; and
    wherein the corrective action comprises braking to avoid the obstacle at a first distance, and steering to avoid the obstacle at a second distance.

2. The system of claim 1, wherein the FAV attributes comprise the FAV's level of driving in terms of a time-based experience level and type of vehicle including left steering or right steering.

3. The system of claim 1, wherein the corrective action is corrective action taken by the previously contacted vehicle that is a leading peer AV.

4. The system of claim 3, wherein the further peer vehicle is a peer AV that is within a 360° view of the FAV.

5. The system of claim 3, wherein the further peer vehicle is determined based on a predefined road type or traffic condition.

6. The system of claim 1, wherein the corrective action taken varies according to a distance to an obstruction.

7. The system of claim 6, wherein the corrective action utilizes braking power or engine power of the FAV.

8. The system of claim 6, wherein the corrective action utilizes relative speed between the FAV and the PV.

9. The system of claim 1, wherein the FAV communicates peer enforcement information based on information received from vehicle sensors to other vehicles for display.

10. The system of claim 1, wherein the FAV utilizes Internet of Things (IoT) capabilities to communicate with other vehicles.

11. The system of claim 1, further comprising a challenger model, wherein the challenger model:
comprises an object tracking system that identifies signs and reads sign information from the signs; and
uses the signs in providing instructions to a driving control.

12. The system of claim 1, wherein:
the machine learning component inputs information from previous accidents; and
the machine learning component uses the information from the previous accidents to create the information about the corrective action.

13. The system of claim 1, wherein:
the corrective action is an FAV corrective action that is determined by a challenger model and is based on an FAV attribute selected from the group consisting of a vehicle model, vehicle volume, vehicle weight, and vehicle occupancy.

14. The system of claim 13, wherein the challenger model determines corrective action within a predefined geofence boundary or within a boundary that is based on dynamic parameters.

15. A computer implemented method for operating a driverless vehicle system, comprising:
communicating information related to attributes of a focus autonomous vehicle (FAV) to another entity selected from the group consisting of a central repository system (CRS) and a peer vehicle (PV);
communicating information related to a previously-sensed corrective action taken by at least one of the FAV and a previously contacted vehicle to the CRS or a further peer vehicle (FPV) that is within a predefined region;
taking, by the FPV, the previously-sensed corrective action in response to the corrective action communication; and
wherein the CRS is accessible via a wireless network to the FAV and the PV, and contains historical corrective action data that is used by a machine learning component of the FAV and the PV to generate respective current corrective actions;
wherein the machine learning component inputs information from previous vehicles' safe travels, and the machine learning component uses the information from the previous vehicles' safe travels to create the information about the corrective action; and
wherein the corrective action comprises braking to avoid the obstacle at a first distance, and steering to avoid the obstacle at a second distance.

16. A non-transitory computer program product for high latency hybrid memory access throttling engine, the computer program product comprising:
one or more computer readable storage media, and program instructions collectively stored on the one or more computer readable storage media, the program instructions comprising program instructions to:
communicate information related to attributes of a focus autonomous vehicle (FAV) to another entity selected from the group consisting of a central repository system (CRS) and a peer vehicle (PV);
communicate information related to a corrective action by at least one of the FAV and a previously contacted vehicle to the CRS or a further peer vehicle (FPV) that is within a predefined region; and
take, by the FPV, the previously-sensed corrective action in response to the corrective action communication;
wherein:
the PAV attributes comprise the FAV's level of driving in terms of a time-based experience level and type of vehicle including left steering or right steering;
the corrective action is corrective action taken by the previously contacted vehicle that is a leading peer AV;
the further peer vehicle is a peer AV that is within a 360° view of the FAV;
the further peer vehicle is determined based on a predefined road type or traffic condition;
the corrective action taken varies according to a distance to an obstruction;
the corrective action comprises braking to avoid the obstacle at a first distance, and steering to avoid the obstacle at a second distance;
the corrective action utilizes braking power or engine power of the FAV;
the corrective action utilizes relative speed between the PAV and the PV;
the FAV communicates peer enforcement information based on information received from vehicle sensors to other vehicles for display;
the FAV utilizes Internet of Things (IoT) capabilities to communicate with other vehicles;
a challenger model:
comprises an object tracking system that identifies signs and reads sign information from the signs; and
uses the signs in providing instructions to a driving control;
the machine learning component inputs information from previous accidents;
the machine learning component uses the information from the previous accidents to create the information about the corrective action;
the machine learning inputs information from previous vehicles' safe travels;
the machine learning uses the information from the previous vehicles' safe travels to create the information about the corrective action;
the corrective action is an FAV corrective action that is determined by a challenger model and is based on an FAV attribute selected from the group consisting of a vehicle model, vehicle volume, vehicle weight, and vehicle occupancy; and
a challenger model determines corrective action within a predefined geofence boundary or within a boundary that is based on dynamic parameters.

* * * * *